(No Model.)　　　　　　　　G. C. PAINE.　　　　　2 Sheets—Sheet 1.

BIT STOCK.

No. 286,840.　　　　　　　　　　　　Patented Oct. 16, 1883.

Witnesses.
Alfred Fawcett
N. E. Renwick

Inventor.
Geo. C. Paine

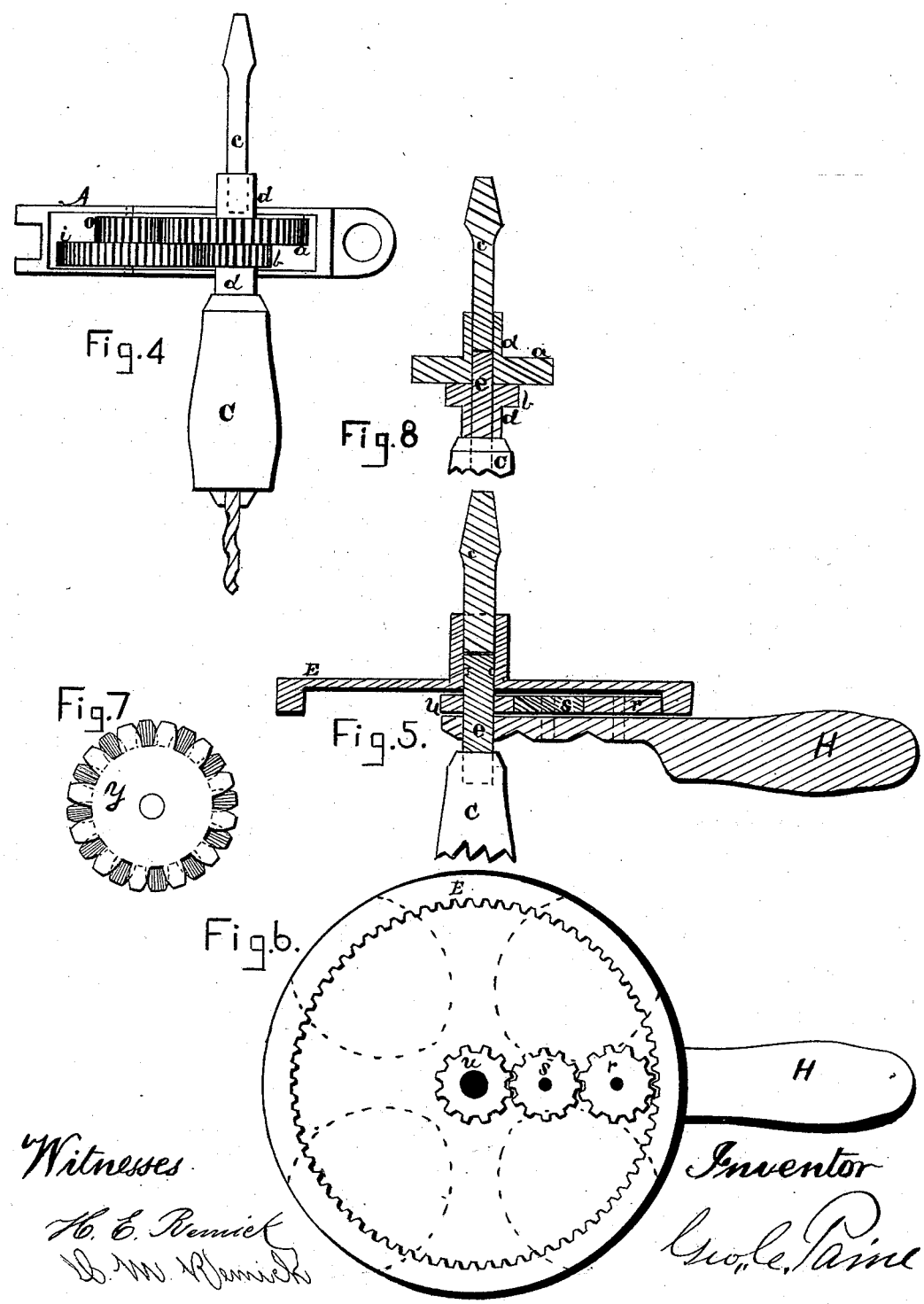

UNITED STATES PATENT OFFICE.

GEORGE C. PAINE, OF BOSTON, MASSACHUSETTS.

BIT-STOCK.

SPECIFICATION forming part of Letters Patent No. 286,840, dated October 16, 1883.

Application filed May 21, 1883. (No model.)

*To all whom it may concern:*

Be it known that I, GEORGE C. PAINE, of Boston, in the county of Suffolk and State of Massachusetts, have invented a new and useful Improvement in Tools for Boring and Drilling Purposes, of which the following is a specification.

My invention relates to a certain useful tool designed to hold a bit, drill, or analogous tool, and by the use of which, in connection with a brace of ordinary construction or other similar and suitable tool-holding device, the bit or drill is caused to rotate faster than the brace or whatever other tool-holding device employed rotates.

The invention consists of novel combinations and arrangements of gears with other parts in a device of the kind above described, by which means a new and useful tool is produced, which may be used in an ordinary brace, and all of which is described hereinafter more in detail.

Figure 2:
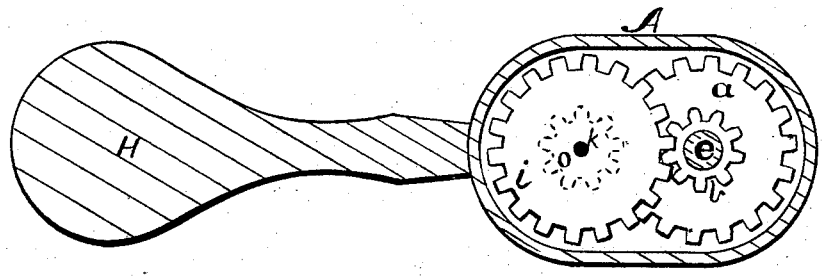
Figure 1:
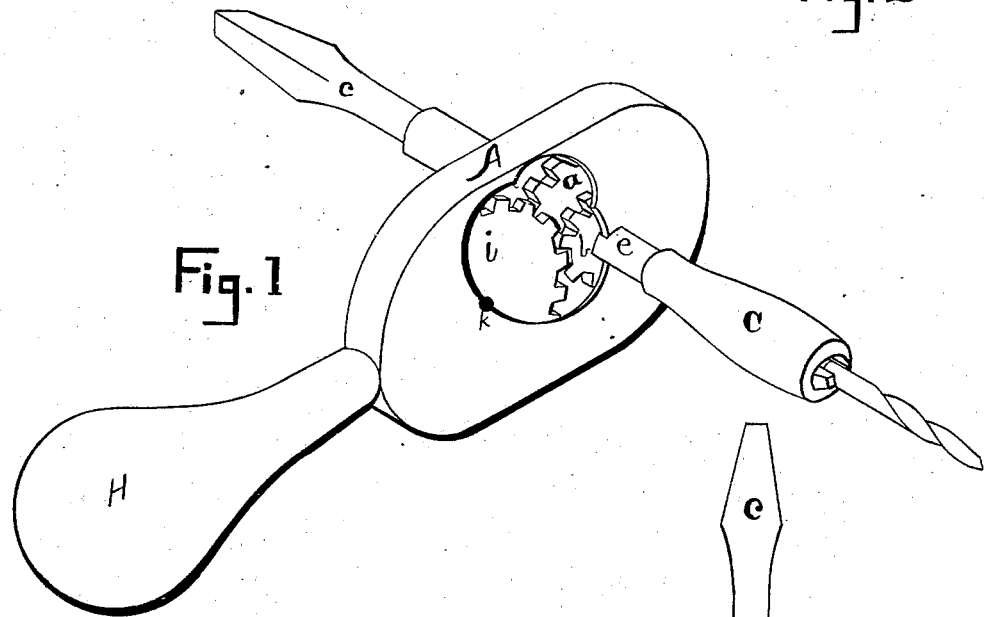
Figure 3:
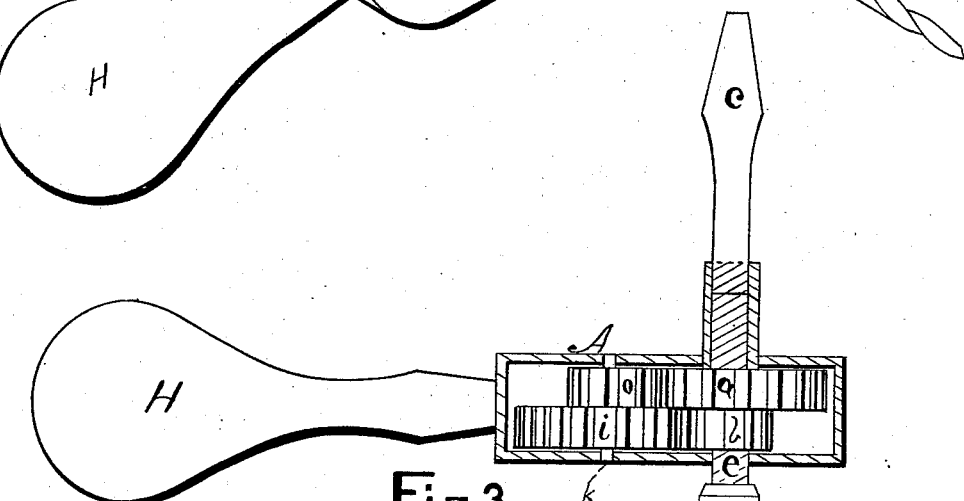

In the accompanying drawings, in which similar letters refer to similar parts, Figure 1 represents an isometrical view of a complete tool. Fig. 2 shows a transverse section in a plane at right angles to the longitudinal plane of the bit or drill, and by which a side view of the gears is shown. Figs. 3 and 4 show transverse sections in a plane corresponding to the longitudinal plane of the bit or drill, and by which the "face" or edge of the gears is shown. Figs. 5 and 6 show modifications of this invention. Figs. 7 and 8 show details of construction.

C indicates a chuck of common construction, and provided with a spindle, $e$, in a manner common to chucks such as are used on well-known braces.

$c$ indicates what I term the "shank," as, although on a line with and apparently a continuation of the spindle $e$, it is an element separate and distinct from the spindle, the line of division being clearly shown in Figs. 5 and 8 and by broken lines in Figs. 3 and 4. One end of the shank $c$ is adapted to be held in an ordinary brace or similar tool-holding device, and upon the other end is rigidly secured a spur-gear wheel, $a$, which gear-wheel is provided with a long hub; and the shank from the hub side of the gear-wheel enters only a short distance, not passing through the gear, which, however, is bored entirely through. (Clearly shown in Fig. 8.)

Upon the spindle $e$ is rigidly fixed a spur-gear, $b$, the spindle passing through the gear $b$ far enough to fill the space in the gear $a$ not filled by the shank $c$, and within which space in the gear $a$ the spindle $e$ is fitted to revolve freely, the construction being clearly shown in Fig. 8. The gear $b$ may or may not be provided with a hub.

A indicates what I term a "frame" or "casing," within which is inclosed the gears $a$ and $b$, with the shank $c$ and spindle $e$, as seen in Figs. 1, 2, 3, and 4. In addition to the gears $a$ and $b$, the frame or casing A incloses the spur-gears $o$ and $i$, which gears ($o$ and $i$) are secured rigidly together and revolve together upon the same shaft or pin, $k$, and are of a pitch and diameter corresponding to the pitch and diameter of the gears $b$ and $a$, and are placed so that the larger gear $a$ will mesh into the smaller gear $o$ and the larger gear $i$ mesh into the smaller gear $b$. As thus arranged it will be at once apparent that if the shank $c$ is revolved by a brace or otherwise it carries with it the gear $a$. This meshing into the gear $o$ revolves $o$, carrying with it $i$, and $i$ meshing with $b$, $b$ is also revolved, together with the chuck and drill, at a speed compared with the speed of the shank $c$ depending, of course, upon the difference in the diameters of the various gears employed, and according to the well-known law of mechanics governing such devices. The frame or casing A would ordinarily be made in two parts, secured together by rivets or other similar modes, the line of division being either as shown in Figs. 3 or 4, as one's judgment may dictate.

In Fig. 6 is shown a plan view of a modification of this invention, with a view in Fig. 5 of a transverse section in a plane corresponding to the longitudinal plane of the drill. In this form of construction it will be observed that the shank $c$ and spindle $e$ maintain the same relative position one to the other as in the construction already described. The large internal gear, E, being fixed rigidly to the shank $c$, thus performs the functions of the gear $a$, as previously described, while the small gear $u$, being secured rigidly to the spindle $e$, thus performs the functions of the gear $b$, as previously described, while the gears $r$ and $s$, transmitting the speed from E to $u$, practically perform the functions of the gears $o$ and $i$, as previously described, the handle H in this case forming a frame upon which the whole is mounted, and all of which being so clearly shown in the drawings as to scarcely need further description.

In using the tool constructed as shown in the various drawings, a handle, H, (more for convenience than otherwise,) is provided, by which the operator may hold and steady the tool, and at the same time prevent it from turning as the shank $c$ or the device which holds it is turned, as were not means adopted to prevent the whole instrument from turning as the tool is used the drill, from friction, would remain stationary.

In addition to the use of this tool with a brace, as described, it may be usefully employed in a lathe, especially in a small or foot lathe, by which means the speed of a small drill may be greatly increased without appreciable extra effort on the part of the operator.

In order to produce the various gears used in the construction of the device herein described, they may be struck out of comparatively thin plate or sheet metal with dies; and in order to insure a greater success in the use of the dies employed in such work, the gears may be struck out with comparatively coarse teeth and placed two or more together, with the teeth of one gear opposite the spaces of the other gear, as shown in Fig. 7, and thus the advantage of smooth-working gears possessing the greatest amount of strength would be obtained at the least cost.

I claim—

1. A boring and drilling tool consisting of a shank adapted to fit a brace of ordinary construction, and a spindle adapted to receive a chuck or drill carrying device, the said shank and spindle being connected only by a system of gears, and the whole being arranged in connection with a suitable frame or casing, substantially as and for the purpose shown and described.

2. A tool consisting of a chuck or drill carrying device, the spindle of which chuck being provided with a gear-wheel and the shank adapted to fit a brace or similar tool-holding device and provided with a gear-wheel, the said shank being independent of but on a line with the spindle of the chuck, and the said gear-wheels with which the said shank and spindle are provided engaging with gears placed in a frame or casing, and the said frame or casing inclosing, also, the said shank and spindle, and constructed substantially as and for the purpose set forth.

GEORGE C. PAINE.

Witnesses:
HENRY F. PAINE,
BAILEY S. CHADBOURNE.